United States Patent
Breau et al.

(10) Patent No.: US 8,761,156 B2
(45) Date of Patent: Jun. 24, 2014

(54) SOCKET-BASED INTERNET PROTOCOL FOR WIRELESS NETWORKS

(75) Inventors: Jeremy R. Breau, Kansas City, MO (US); John H. Bennett, III, Lawrence, KS (US); Terry D. Nebergall, Gardner, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/560,480

(22) Filed: Jul. 27, 2012

(65) Prior Publication Data

US 2012/0294259 A1  Nov. 22, 2012

Related U.S. Application Data

(63) Continuation of application No. 12/400,588, filed on Mar. 9, 2009, now Pat. No. 8,279,853.

(51) Int. Cl.
*H04L 12/64* (2006.01)
*H04J 3/14* (2006.01)

(52) U.S. Cl.
USPC .......................................... 370/352; 370/241

(58) Field of Classification Search
CPC ............................ H04L 43/50; H04L 12/5695
USPC ......... 370/400, 401, 389, 392, 396, 419, 420, 370/428, 429, 352, 395.3, 241, 351
See application file for complete search history.

(56) References Cited

U.S. PATENT DOCUMENTS

| | | | |
|---|---|---|---|
| 7,031,275 B1 * | 4/2006 | Borella et al. | 370/328 |
| 7,471,684 B2 | 12/2008 | Finley et al. | |
| 7,974,311 B2 | 7/2011 | Vesterinen et al. | |
| 8,009,614 B2 | 8/2011 | Oguchi | |
| 8,279,853 B1 * | 10/2012 | Breau et al. | 370/352 |
| 2005/0174998 A1 | 8/2005 | Vesterinen et al. | |

OTHER PUBLICATIONS

First Action interview Office action, mailed Feb. 6, 2012, in U.S. Appl. No. 12/400,588.
Preinterview First office Action mailed Oct. 11, 2013 in U.S. Appl. No. 13/560,480. 1 new cited Reference.
First Action Interview Office Action, mailed Jan. 20, 2012, in U.S. Appl. No. 12/400,588.
Pre interview Office Action, mailed Oct. 20, 2011, in U.S. Appl. No. 12/400,588.
Internet Protocol, DARPA Internet Program, Protocol Specification, Sep. 1981, pp. 1-52, Information Sciences Institute, University of Southern California, Marina del Rey, California.

(Continued)

Primary Examiner — Hanh N Nguyen

(57) ABSTRACT

Systems and methods for assigning unique network identifiers in a packet-switched wireless network and methods for communicating with a wireless device in a packet-switched wireless network are provided. A request for a unique network identifier for a wireless device is received. A socket-based unique network identifier, including an IP address and one or more ports, is assigned to the wireless device. The unique network identifier is created by combining an IP address and one or more ports. This allows multiple unique network identifiers to be created from a single IP address, where each unique network identifier consists of the same IP address combined with a different group of one or more ports.

10 Claims, 3 Drawing Sheets

(56) References Cited

OTHER PUBLICATIONS

Johnson, D., et al., "Mobility Support in IPv6", Jun. 2004, pp. 1-166, The Internet Society.
Internet Information and Resources: IPv6, pp. 1-5, Feb. 4, 2009, The Internet Society. http://www.isoc.org/educpillar/resources/ipv6_faq.shtml.
Deering, S., et al., "Internet Protocol, Version 6 (IPv6)", pp. 1-40, Dec. 1998, The Internet Society.
Huston, Geoff, "The Changing Foundation of the Internet: Confronting IPv4 Address Exhaustion," pp. 1-10, Jun. 11, 2009, The Internet Protocol Journal, vol. 11, No. 3. http://www.cisco.com/web/about/ac123/ac147/archived_issues/ipj_11-3/113_ipv4.html.
Perkins, C., "IP Mobility Support for IPv4", pp. 1-100, Aug. 2002, The Internet Society.
Pre-Interview First Action Interview in U.S. Appl. No. 12/690,825 mailed Nov. 28, 2012, 12 pages.
Pre interview Office Action, ailed May 14, 2012, in U.S. Appl. No. 12/634,299.
Reverse DNS Lookup, accessed on Dec. 14, 2009, http://en.wikipedia.org|wiki/Reverse_DNS_lookup.
Link Layer, accessed Dec. 7, 2009, http://en.wikipedia.org/wiki/Link_Layer.
Internet Protocol Suite, accessed Dec. 7, 2009, http:||en.wikipedia.org|wiki/Internet_Protocol_Suite.
File: IP Stack Connections.svg, accessed Dec. 7, 2009, http://en.wikipedia.org/wiki/File:IP_stack_Connections.svb.
OSI Model, accessed Dec. 7, 2009, http:||en.wikipedia.org/wiki/OSI_model.
Network Layer, accessed Dec. 7, 2009, http://en.wikipedia.org/wiki/Network_Layer.
Internet Protocol, accessed Dec. 7, 2009, http://en.wikipedia.org/wiki/Internet_Protocol.
Internet Layer, accessed Dec. 7, 2009, http://en.wikipedia.org/wiki/Internet_Layer.
Address Resolution Protocol, accessed Dec. 7, 2009, http:||en.wikipedia.org/wiki/Address_Resolution_Protocol.
First Action Interview Office Action, mailed May 1, 2012 in U.S. Appl. No. 12/433,483.
Pre Interview First Office Action mailed Mar. 23, 2012 in U.S. Appl. No. 12/433,483.
Preinterview First Office Action mailed May 14, 2012 in U.S. Appl. No. 12/634,299.
U.S. Appl. No. 12/433,483, filed Apr. 30, 2009.
U..S. Appl. No. 12/400,588, filed Mar. 9, 2009.

* cited by examiner

US 8,761,156 B2

SOCKET-BASED INTERNET PROTOCOL FOR WIRELESS NETWORKS

CROSS-REFERENCE TO RELATED APPLICATIONS

This application is a continuation of U.S. patent application Ser. No. 12/400,588, filed Mar. 9, 2009, entitled "SOCKET-BASED INTERNET PROTOCOL FOR WIRELESS NETWORKS," which is herein incorporated by reference.

BACKGROUND

Communication among wireless devices typically occurs through networks. For wireless devices to communicate, each wireless device must have a unique network identifier. In packet-switched networks, each wireless device is assigned an internet protocol (IP) address to identify the particular wireless device in the network.

The dominant standard for IP addresses is internet protocol version four (IPv4). IPv4 addresses are 32 bits in length, which limits the possible number of IPv4 addresses available for use to 4,294,967,296 ($2^{32}$). As the number of devices seeking network connections continues to grow, the number of available IPv4 addresses continues to decline and will eventually reach zero. This problem is known as IPv4 address exhaustion. Although estimates of the approximate date of IPv4 address exhaustion vary, it is widely recognized that IPv4 addresses will eventually be exhausted.

SUMMARY

Embodiments of the present invention relate to systems and methods for assigning unique network identifiers in a packet-switched wireless network. The systems and methods describe assigning a socket-based unique network identifier, including an IP address and one or more ports, to a wireless device. Creating a unique network identifier by combining an IP address and one or more ports allows the assignment of unique network identifiers to multiple wireless devices in the same network using only one IP address. Because each unique network identifier includes one or more ports in addition to an IP address, the usefulness of one IP address is extended from one wireless device to multiple wireless devices.

In one embodiment, a request for a first unique network identifier for a first wireless device is received. A first unique network identifier, including an IP address and one or more ports, is assigned to the first wireless device. A request for a second unique network identifier for a second wireless device is received. A second unique network identifier is assigned to the second wireless device. The second unique network identifier includes the same IP address assigned to the first wireless device and one or more ports that are not assigned to the first wireless device.

In another embodiment, a unique network identifier assignment system is provided. The system includes an intake component for receiving requests for unique network identifiers and an assignment component which assigns unique network identifiers that include an IP address and one or more ports. As described above, the assigned unique network identifiers are created such that multiple wireless devices may be assigned unique network identifiers while using only one IP address.

An embodiment is also contemplated in which the Mobile IP protocol is implemented in the packet-switched wireless network. In Mobile IP-configured systems, the intake component and assignment component are part of a home agent.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Figure 1:
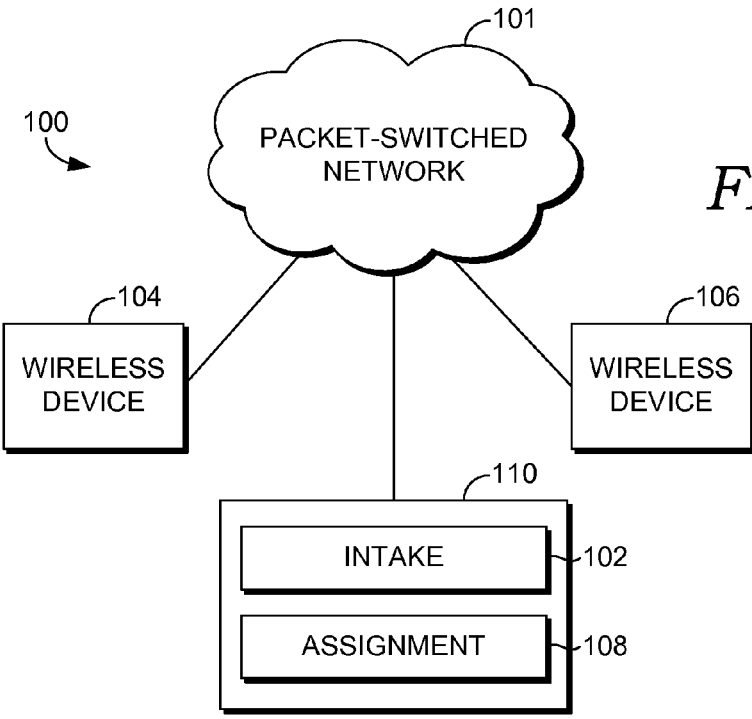
FIG. 1 is a block diagram of a unique network identifier assignment system according to an embodiment of the present invention.

Embodiments of the present invention are described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems and methods for assigning unique network identifiers in a packet-switched wireless network. In packet-switched networks, information is divided into packets and routed to a destination. Internet protocol (IP) is the predominant packet-switching protocol, which enables delivery of packets from a source device to a destination device. In order for a data packet to successfully complete the journey from source to destination, each source and destination device must have a unique network identifier. Currently, each wireless device in a packet-switched network is assigned an IP address as a unique network identifier. IP addresses can be assigned manually or through dynamic host configuration protocol (DHCP) or other protocols or methods.

As discussed above, the dominant standard for IP addresses is IPv4. Internet protocol version six (IPv6) has been developed as an alternative to IPv4, but IPv6 has not been widely adopted. While IPv6 would provide 128-bit addressing (providing $2^{128}$ possible addresses) and virtually eliminate the concern of IP address exhaustion, implementation of IPv6 requires a significant software and hardware investment and is not a practical solution to IPv4 exhaustion at this time.

When an IP address is assigned to a single wireless device, thousands of ports are often left unused. Each IP address has 65,536 ($2^{16}$) ports. Some ports are typically assigned specific functions. For example, port 80 is typically assigned to hypertext transfer protocol (HTTP) communication. Ports typically assigned to specific functions and ports actually used by the device to which an IP address is assigned only constitute a small percentage of the available ports, leaving potentially thousands of ports unused. The systems and methods described herein make use of these currently unused ports and allow one IP address to be assigned to potentially thousands of wireless devices, thus providing an immediate, cost-effective solution to IPv4 exhaustion.

Embodiments of the invention relate to assigning a unique network identifier, including an IP address and one or more ports, to a wireless device. The combination of an IP address and a port is known as a socket and can be written as "IP_address:port." For example, the socket consisting of IP address 192.168.1.1 and port 1200 is written "192.168.1.1:1200." A second socket-based unique identifier can then be assigned to a second wireless device using the same IP address and one or more different ports that were not assigned to the first wireless device. For example, 192.168.1.1:1200-1299 may be assigned to a first wireless device, and 192.168.1.1:1300-1399 may be assigned to a second wireless device.

FIG. 1 illustrates a unique network identifier assignment system 100 for packet-switched network 101. In packet-switched network 101, which could be the Internet, a local area network (LAN), wide area network (WAN), or other packet-switched network, intake component 102 receives requests to assign a unique network identifier to a wireless device, such as wireless devices 104 and 106. The request could originate from wireless device 104 or from a server, network manager, or other network entity. Wireless device 104 may be a web-enabled mobile device, "smart" mobile phone, PDA, laptop computer, or other wireless device. In one embodiment, intake component 102 is a server or other computing device with software functionality to receive and forward requests for unique network identifiers. In alternate embodiments, the functionality of intake component 102 is distributed across multiple computing devices. In still other embodiments, intake component 102 is a functional component of a single server or computing device.

With continued reference to FIG. 1, assignment component 108 identifies an unassigned unique network identifier and assigns the unassigned unique network identifier to the requesting wireless device, such as wireless device 104 or 106. In one embodiment, assignment component 108 is a server or other computing device with software functionality to identify and assign unique network identifiers. In other embodiments, the functionality of assignment component 108 is distributed across multiple computing devices. In still other embodiments, assignment component 108 and intake component 102 are functional components of a single server or computing device, such as server 110. Assignment component 108 may also be the network manager.

With continued reference to FIG. 1, the unique network identifier identified and assigned by assignment component 108 includes an IP address and one or more of that IP address's 65,536 ports. In one embodiment, the unused ports for a particular IP address are grouped before assignment, such that for one IP address, a list of unique network identifiers is created, each identifier including the IP address and one or more ports. In certain embodiments, the unused ports of a particular IP address are organized into groupings of a number of ports predetermined to be generally sufficient for wireless devices—for example, 100 ports per grouping. The ports contained in each grouping may be continuous or non-continuous. According to these embodiments, when a request for a unique network identifier is received, assignment component 108 selects a unique network identifier from the list.

Embodiments of the invention present assignment component 108 with multiple IP addresses available to assign. In such embodiments, each IP address is divided into multiple unique network identifiers as described above. Assignment component 108 assigns a requesting wireless device any of the unassigned unique network identifiers. For example, assignment component 108 assigns IP address 1.2.3.4, combined with ports 220-319, to address-requesting wireless device 104. Assignment component 108 might then assign IP address 1.2.3.4, combined with a different port grouping, such as 320-419, to address-requesting wireless device 106. Alternatively, assignment component 108 assigns a different IP address, such as 9.8.7.6, combined with a port grouping to address-requesting wireless device 106. Although FIG. 1 indicates only two wireless devices for simplicity, any number of wireless devices is contemplated. No particular order need be followed in assigning unique network identifiers to wireless devices. That is, all unique network identifiers created from one particular IP address do not need to be assigned before unique network identifiers created from a different IP address are assigned.

With continued reference to FIG. 1, different wireless devices may require different numbers of total ports. In such embodiments, assignment component 108 evaluates what type of wireless device is requesting a unique network identifier, or whether the requesting wireless device has specific functions or requirements, including the device's bandwidth needs, and dynamically groups unused ports to form a unique network identifier with an appropriate number of ports. Alternatively, an IP address's unused ports are grouped into groupings of different sizes before a request for a unique network identifier is received. Depending on the embodiment of the invention, port grouping and creation of unique network identifiers could be performed by assignment component 108 or could be performed external to assignment component 108.

With continued reference to FIG. 1, assignment component 108 assigns a socket-based unique network identifier either automatically or manually. DHCP is the predominant protocol used to automatically assign IP addresses, DNS server addresses, Gateway IPs, and SubNet Masks, although other protocols could be used. DHCP can be modified to assign a port with an IP address. Packet-switched communication can occur through a variety of transport layer protocols such as transmission control protocol (TCP) or user datagram protocol (UDP). For a computing device running the Microsoft Windows operating system, a socket-based unique network identifier can be assigned using the commands below. These exemplary commands assign a socket-based unique network identifier created by combining an IP address and ports 34,000-34,999 of that IP address. Commands are presented for both TCP and UDP communication.

netsh int ipv4 set dynamicport tcp start=34000 num=1000 (TCP) or netsh int ipv4 set dynamicport udp start=34000 num=1000 (UDP).

For a computing device running Linux, the same unique network identifier may be manually assigned using the following command:

sysctl -w net.ipv4.ip_local_port_range="34000 35000."

Figure 2:
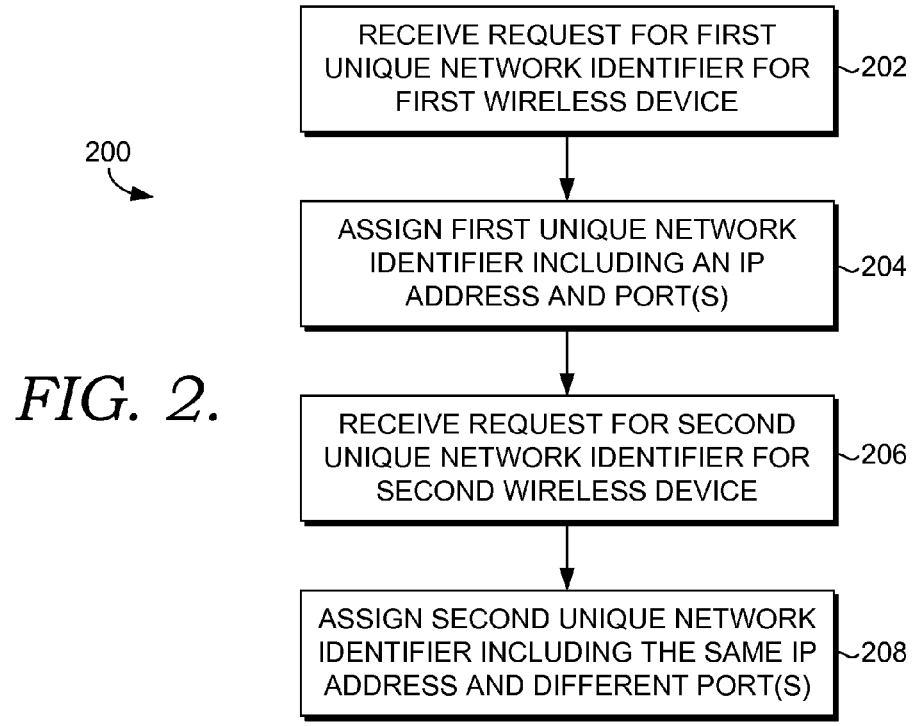
FIG. 2 is a flow chart of an exemplary method for assigning a unique network identifier in a packet-switched network.

FIG. 2 illustrates an exemplary method 200 of assigning a socket-based unique network identifier in a wireless network. A request for a first unique network identifier for a first wireless device is received in step 202. The request could come from the first wireless device or from a server, network manager, or other network entity. A first unique network identifier is assigned in step 204. The first unique network identifier includes an IP address and one or more ports, as discussed in detail above. The first unique network identifier can be assigned as described above. A request for a second unique network identifier for a second wireless device is received in step 206. As with step 202, the request could come from the second wireless device or from a server, network manager, or other network entity. A second unique network identifier is assigned in step 208. The second unique network identifier includes the same IP address as the first unique network identifier and one or more ports that are not part of the first unique network identifier. Thus, method 200 allows two unique network identifiers to be assigned using only one IP address.

Communications may occur consistent with various protocols and standards on a wireless, packet-switched network. These communications standards include Simple IP, Mobile IP, proxy Mobile IP, 3GPP, and 3GPP2, among others. Mobile IP is an Internet Engineering Task Force (IETF) protocol (IETF RFC 3344), which allows wireless devices to move from one network to another while maintaining an IP address. This is accomplished through a system of home agents and foreign agents. A home agent is responsible for assigning and maintaining IP addresses for each wireless device (or "mobile node") that registers with the home agent. The IP address for a mobile node that is registered with the home agent serves as that mobile node's unique network identifier to other devices.

Because of the nature of wireless devices, the mobile node may need to move to a different network and reestablish connection. To preserve the original IP address, the mobile node attaches to a foreign agent, which is the agent to which mobile nodes whose home agent is in another network attach. The foreign agent then communicates with the mobile node's home agent. Thus, a mobile node's home agent keeps track of the mobile node's unique network identifier (IP address) and the address of the foreign agent where the mobile node is currently located. When a packet is sent to a particular mobile node, the packet first arrives at the mobile node's home agent and is then routed either directly to the mobile node if the node is currently in the home agent's network or is routed to a foreign agent in whose network the mobile node is currently located.

Figure 3:
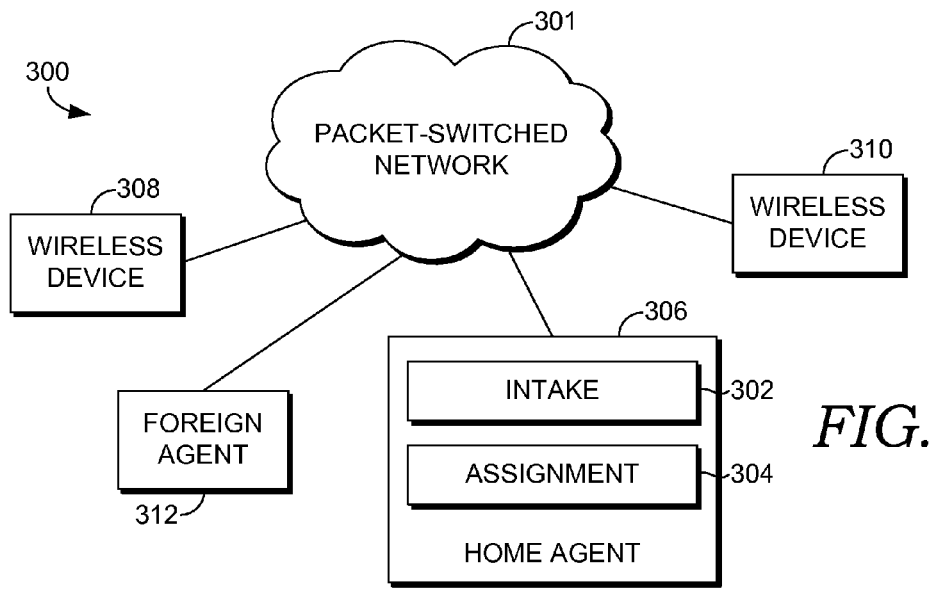
FIG. 3 is a block diagram of a unique network identifier assignment system configured for Mobile IP according to an embodiment of the present invention.

FIG. 3 illustrates an embodiment of a unique network identifier assignment system 300 for a packet-switched network 301 that is configured for Mobile IP. In packet-switched network 301, which could be the Internet, a local area network (LAN), wide area network (WAN), or other packet-switched network, intake component 302 and assignment component 304 are part of home agent 306. Intake component 302 receives a request to assign a unique network identifier to a wireless device, such as wireless devices 308 and 310. The request could originate from wireless device 308 or from a server, network manager, or other network entity. Wireless device 308 could be a web-enabled mobile device, "smart" mobile phone, PDA, laptop computer, or other wireless device. In some embodiments, intake component 302 is a server or other computing device with software functionality to receive and forward requests for unique network identifiers. In other embodiments, the functionality of intake component 302 is distributed across multiple computing devices and is coordinated by home agent 306 in other embodiments. In further embodiments, intake component 302 is a functional component of a home agent implemented on a single server or computing device.

With continued reference to FIG. 3, assignment component 304 of home agent 306 identifies an unassigned unique network identifier and assigns the unassigned unique network identifier to the requesting wireless device, such as wireless device 308 or 310. In certain embodiments, assignment component 304 is a server or other computing device with software functionality to identify and assign unique network identifiers. The functionality of assignment component 304 is distributed across multiple computing devices and coordinated by home agent 306 in other embodiments. In still other embodiments, assignment component 304 is a functional component of a single server or computing device. Foreign agent 312 is included in some embodiments. If wireless device 308 or 310 leaves the network of home agent 306, wireless device 308 or 310 connects with a foreign agent, such as foreign agent 312, which communicates with home agent 306 in the manner described previously.

With continued reference to FIG. 3, the unique network identifier identified and assigned by assignment component 304 of home agent 306 includes an IP address and one or more of that IP address's 65,536 ports. In one embodiment, the total number of unused ports for a particular IP address is divided into groups before assignment, such that for one IP address, a list of unique network identifiers is created, each identifier including the IP address and one or more ports. The groups into which the unused ports of a particular IP address are divided may be a number of ports predetermined to be generally sufficient for wireless devices—for example, 100 ports per grouping. The ports contained in each grouping may be continuous or non-continuous. When a request for a unique network identifier is received, assignment component 304 of home agent 306 then selects an identifier from the list.

In embodiments of the invention, assignment component 304 of home agent 306 has multiple IP addresses available to assign. In such embodiments, each IP address is divided into multiple unique network identifiers as described above. Assignment component 304 assigns a requesting wireless device any of the unassigned unique network identifiers. For example, assignment component 304 could assign IP address 1.2.3.4, combined with ports 220-319, to address-requesting wireless device 308. Assignment component 304 could then assign IP address 1.2.3.4, combined with a different port grouping, such as 320-419, to address-requesting wireless device 310. Alternatively, assignment component 304 could assign IP address 9.8.7.6 combined with a port grouping to address-requesting wireless device 310. Assignment component 304 of home agent 306 assigns socket-based unique network identifiers using DHCP.

With continued reference to FIG. 3, different wireless devices may require different numbers of total ports. In certain embodiments, assignment component 304 of home agent 306 evaluates what type of wireless device is requesting a unique network identifier, or whether the requesting wireless device has specific functions or requirements, including the device's bandwidth needs, and dynamically groups unused ports to form a unique network identifier with an appropriate number of ports. Alternatively, an IP address's unused ports may be grouped into groupings of different sizes before a request for a unique network identifier is received. Depending on the embodiment of the invention, port grouping and creation of unique network identifiers may be performed by assignment component 304 or may be performed external to assignment component 304.

Figure 4:
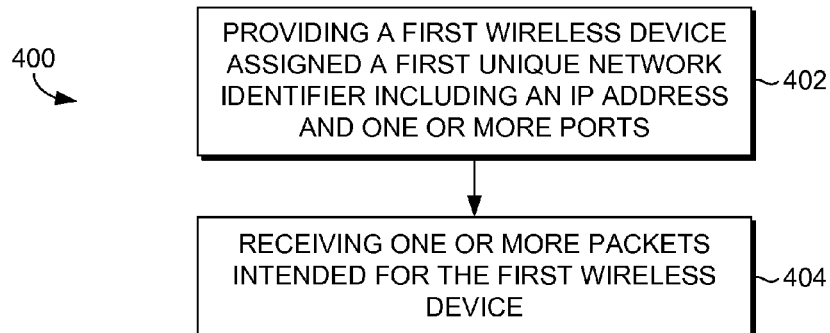
FIG. 4 is a flow chart of an exemplary method for communicating with a wireless device in a packet-switched network.
Figure 4:
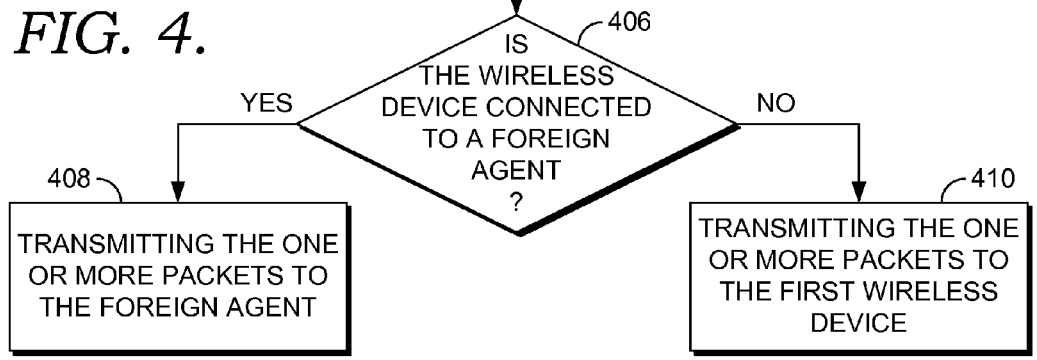

FIG. 4 illustrates an exemplary method 400 of communicating with a first wireless device in a packet-switched network having a plurality of wireless devices. In step 402, a first wireless device is provided that has been assigned a unique network identifier that includes an IP address and one or more ports. The identifier is created in the manner detailed above such that a second unique network identifier, including the same IP address and one or more different ports that are not part of the first unique identifier, may be assigned to a second wireless device. One or more packets intended for the first wireless device are received in step 404. The receiving entity could be a server, network manager, or other computing device. Based on the unique network identifier, the one or more packets are transmitted to the first wireless device in step 410.

With continued reference to FIG. 4, in a Mobile IP-configured network, a home agent receives the one or more packets in step 404. In step 406, the home agent determines if the first wireless device has connected to a foreign agent in another network. Upon determining that the first wireless device has connected to a foreign agent in another network, the home agent transmits the one or more packets to the foreign agent in step 408. The one or more packets are then transmitted to the first wireless device by the foreign agent. If the home agent determines in step 406 that the first wireless device has not connected to any foreign agent, then the home agent will transmit the one or more packets to the first wireless device.

Figure 5:
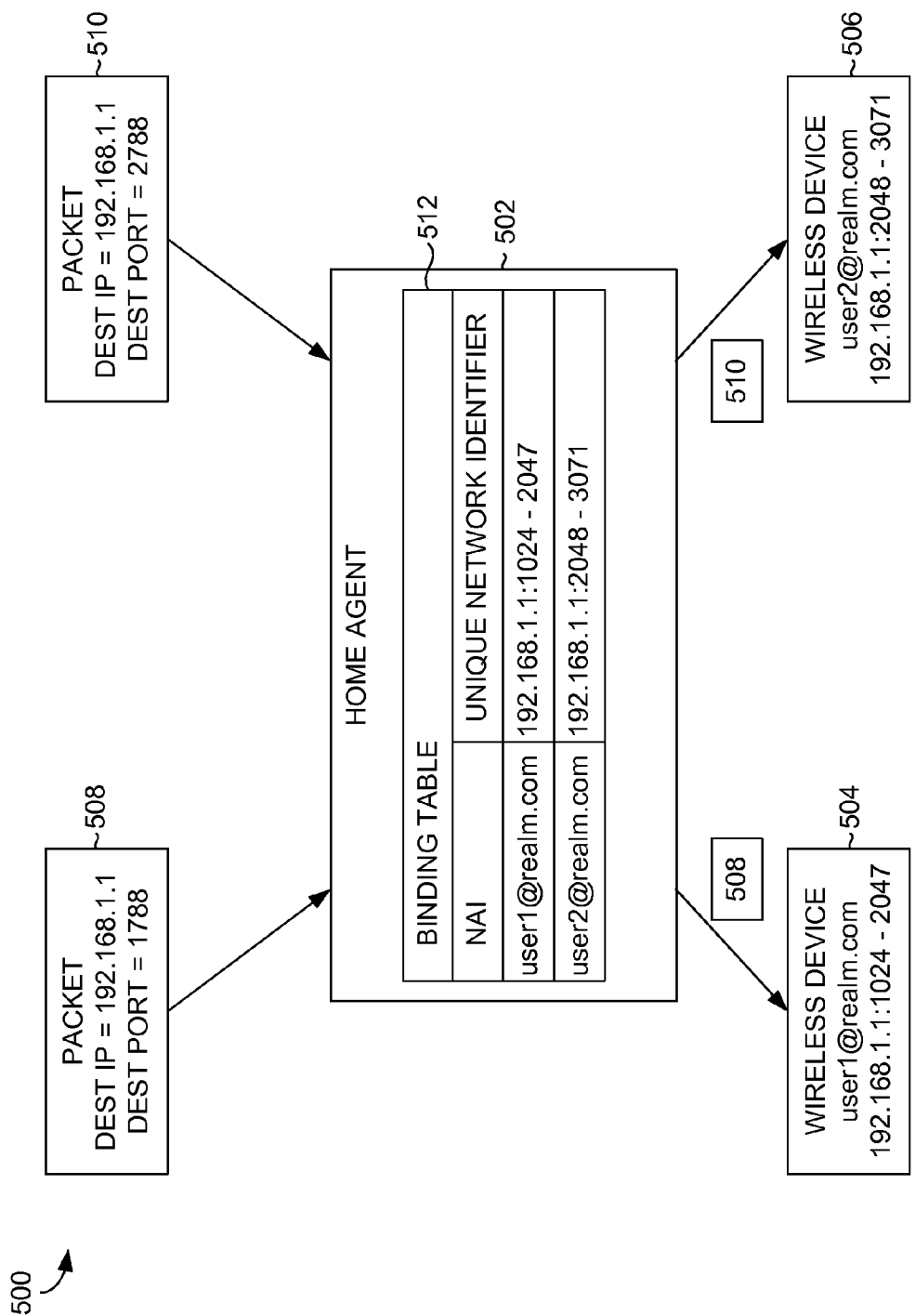
FIG. 5 is a block diagram of a wireless device communication system according to an embodiment of the present invention.

FIG. 5 further illustrates the method of communicating with a wireless device discussed with reference to FIG. 4 in a Mobile IP-configured network. Mobile IP-configured wireless communication system 500 includes home agent 502, wireless device 504, and wireless device 506. When wireless devices request access to the network, each device is identified by a network access identifier (NAI), as detailed in standard protocol RFC 4282. Wireless device 504 is identified by user1@realm.com, and wireless device 506 is identified by user2@realm.com. Wireless device 504 was assigned IP address 192.168.1.1 and port range 1024-2047. Wireless device 506 was also assigned IP address 192.168.1.1 but was assigned a different port range—2048-3071.

With continued reference to FIG. 5, packet 508 and packet 510 are received by home agent 502. Packet 508 has a destination IP address of 192.168.1.1 and a destination port of 1788. Packet 510 has a destination IP address of 192.168.1.1 and a destination port of 2788. Binding table 512 contains a listing of NAIs for wireless devices that have been assigned unique network identifiers by the home agent as well as the unique network identifiers that were assigned. When packet 508 arrives at home agent 502, home agent 502 compares the destination IP address and destination port of packet 508, which is 192.168.1.1:1788, to the binding table entries. After accessing the binding table, home agent 502 determines user1@realm.com and user2@realm.com are associated with the IP address 192.168.1.1. The home agent then locates the NAI whose port range includes the destination port 1788. Wireless device 504 (user1@realm.com) has been assigned port range 1024-2047, so packet 508 is routed to wireless device 504.

The process is repeated for packet 510. Packet 510 is received by home agent 502. Home agent 502 compares the destination IP address and destination port of packet 510, which is 192.168.1.1:2788, to the binding table entries. After accessing the binding table, home agent 502 determines user1@realm.com and user2@realm.com are associated with the IP address 192.168.1.1. The home agent then locates the NAI whose port range includes the destination port 2788. Because wireless device 506 (user2@realm.com) has been assigned port range 2048-3071, packet 510 is routed to wireless device 506.

Although FIG. 5 does not include any foreign agents for simplicity, packets 508 and 510 could also be routed to wireless devices 504 and 506, respectively, when wireless devices 504 and 506 are connected to foreign agents. In such an embodiment, wireless devices 504 and 506 are located in networks other than the network in which the home agent is located. Consistent with the home agent/foreign agent operation described previously, packet 508 is routed from home agent 502 to the foreign agent to which wireless device 504 is connected and then to wireless device 504. Similarly, packet 510 is routed from home agent 502 to the foreign agent to which wireless device 506 is connected and then to wireless device 506.

When wireless devices 504 and 506 send packets to other wireless devices or computing devices, the packets first arrive at home agent 502 before being forwarded on to the proper destination. Each sent packet includes a source IP address and source port. Home agent 502, or a foreign agent if wireless device 504 or 506 are connected to a foreign agent, ensures that the source IP address of the packet sent from wireless device 504 or 506 is the IP address assigned to the particular sending wireless device and that the source port is one of the one or more ports assigned to the particular sending wireless device. If either the source IP address or the source port is incorrect, the sent packet is rejected by home agent 502 or a foreign agent if wireless device 504 or 506 is connected to a foreign agent.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. A computer-implemented method of verifying the source IP address of a wireless device, the method comprising:
   extracting a source IP address of a packet generated by the wireless device;
   checking the address to verify that the address is properly formatted, wherein the IP address is assigned to ports that are grouped into at least two groups;
   obtaining the port assigned to the IP address, wherein the assigned ports are grouped into at least two groups that vary in size, vary in bandwidth capability, and vary in wireless device functionality available;
   checking the port to verify that the port is within the assigned range for the wireless device;
   when either the address or port are invalid, rejecting the packet; and
   when the address and port are valid, transmitting the packet to a destination identified in the packet.

2. The method of claim 1, wherein the mobile device is connected to a foreign agent.

3. The method of claim 1, wherein the mobile device is connected to a home agent.

4. The method of claim 1, wherein the mobile device and the destination identified in the packet are connected to a wireless network configured to support the 3GPP2 standard.

5. The method of claim 1, wherein the IP address is an IPv4 address.

6. The method of claim 1, wherein the wireless network is configured to support the Mobile IP standard.

7. One or more non-transitory computer-readable media storing instructions that when executed by a processor perform a method to verify the source IP address of a wireless device, the method comprising:

extracting a source IP address of a packet generated by the wireless device, wherein the IP address is assigned ports that are grouped into at least two groups and the at least two groups vary in one or more of the following: size, bandwidth capability, and wireless device functionality available;

checking the address to verify that the address is properly formatted;

checking the port to verify that the port is within the assigned range for the wireless device;

when either the address or port are invalid, rejecting the packet; and when the address and port are valid, transmitting the packet to a destination identified in the packet.

8. The media of claim 7, wherein the mobile device is connected to a foreign agent.

9. The media of claim 7, wherein the mobile device is connected to a home agent.

10. The media of claim 7, wherein the mobile device and the destination identified in the packet are connected to a wireless network configured to support the 3GPP2 standard.

\* \* \* \* \*